United States Patent
Ross, Jr. et al.

(10) Patent No.: US 7,371,021 B2
(45) Date of Patent: May 13, 2008

(54) VIBRATION RESISTANT CAMERA FOR MOUNTING TO ARCHERY BOW

(75) Inventors: Charles Andrew Ross, Jr., Overland Park, KS (US); Robert Dale Haler, Grain Valley, MO (US)

(73) Assignee: Digital Ally, Inc., Overland Park, KS (US)

( * ) Notice: Subject to any disclaimer, the term of this patent is extended or adjusted under 35 U.S.C. 154(b) by 177 days.

(21) Appl. No.: 11/198,247

(22) Filed: Aug. 5, 2005

(65) Prior Publication Data
US 2006/0029383 A1    Feb. 9, 2006

Related U.S. Application Data (60) Provisional application No. 60/599,137, filed on Aug. 5, 2004.

(51) Int. Cl.
*G03B 17/00* (2006.01)

(52) U.S. Cl. ........................ 396/419; 396/421

(58) Field of Classification Search ................ 396/419, 396/420, 421, 426
See application file for complete search history.

(56) References Cited

U.S. PATENT DOCUMENTS

| | | | |
|---|---|---|---|
| 5,107,286 A * | 4/1992 | Sergeant et al. .............. 396/26 |
| 5,199,563 A * | 4/1993 | Goodman ................ 206/316.2 |
| 6,286,796 B1 | 9/2001 | Pugliesi | |
| 6,425,697 B1 * | 7/2002 | Potts et al. .................. 396/426 |
| 6,526,956 B1 | 3/2003 | Hankins | |
| 6,779,059 B2 * | 8/2004 | Han et al. ..................... 710/62 |

OTHER PUBLICATIONS

Navcon & Related Products Information, Allsop/Sims Vibration, Bellingham, Washington, 1980.

* cited by examiner

*Primary Examiner*—Christopher Mahoney
(74) *Attorney, Agent, or Firm*—Spencer Fane Britt & Browne LLP (57) ABSTRACT

A digital camera is adapted for being mounted to a bow for archery. The camera comprises a self-contained digital unit within a housing and is protected from vibrational disturbances caused by the release of the bowstring. A viscoelastic material is used to reduce vibrations. The housing is water resistant to protect the internal circuitry of the camera from environmental elements encountered during hunting. A secure digital slot is connected to the digital camera circuitry and can accept a SD flash memory card. The camera may also be connected for transmitting images to an external device for viewing.

24 Claims, 6 Drawing Sheets

VIBRATION RESISTANT CAMERA FOR MOUNTING TO ARCHERY BOW

CROSS REFERENCE TO RELATED APPLICATIONS

This application claims priority benefit from U.S. Provisional Patent Application Ser. No. 60/599,137, filed Aug. 5, 2004, and the subject matter of that application is incorporated herein by reference.

BACKGROUND OF THE INVENTION

This invention relates to cameras mounted to archery bows. The thrill of the hunt, and head-to-head competition in archery contests, has motivated the archer to record his performance. The benefits of capturing the travel of the arrow, or reaction of the prey, are numerous and help the hunter/archer to enhance his skills. By watching the recorded activity, the hunter/archer can better understand the mechanics of the sport, and correct errors where present in order to become a better archer. Furthermore, it provides a source of enjoyment to relive the thrill of the hunt, or to admire the grace and beauty of arrow flight.

There exist a number of bow-mounted cameras that achieve varying degrees of success. In addition to single-shot cameras, there also exist multi-frame, or video, cameras that are mountable to bows. As with any hand-held camera, however, the quality of the picture obtained depends in large part on minimizing the susceptibility of the camera to extraneous motion. While it may be practically impossible to completely remove the effects of a wavering hand, it is nonetheless desirable to minimize the vibration effects of the bowstring upon release. The twang of the bowstring, besides creating a vibratory distortion to the recording process, is also a violent shaking that can cause damage to the camera itself.

Accordingly, it is desirable to provide a camera that can be mounted to an archery bow, where the camera is capable of withstanding and minimizing the vibration effects from the release of the bowstring. It is also desirable to provide a camera that is of simple construction and that can be easily mounted to a bow. It is further desirable that such camera be either a single shot digital camera or a digital video, or multi-frame, camera.

BRIEF SUMMARY OF THE INVENTION

There is, therefore, provided in the practice of the invention a camera that is mountable to a bow. The camera is encased within a housing, which has a vibration-dampening member to decrease the deleterious effects of vibrational disturbances caused by the release of the bowstring. The camera can be either a single shot camera, or a video camera.

In accordance with another embodiment of the present invention, the camera is a small, light weight, battery powered digital video camera that uses solid state memory as the recording media.

Accordingly, it is an object of the present invention to provide an improved bow camera which is a completely self-contained digital unit. There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention. Though some features of the invention may be claimed in dependency, each feature has merit when used independently.

BRIEF DESCRIPTION OF THE DRAWINGS

Further features of the present invention will become apparent to those skilled in the art to which the present invention relates from reading the following description with reference to the accompanying drawings, in which.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the Figures. Instead, the sizes of certain small components have been exaggerated for illustration.

Figure 1:
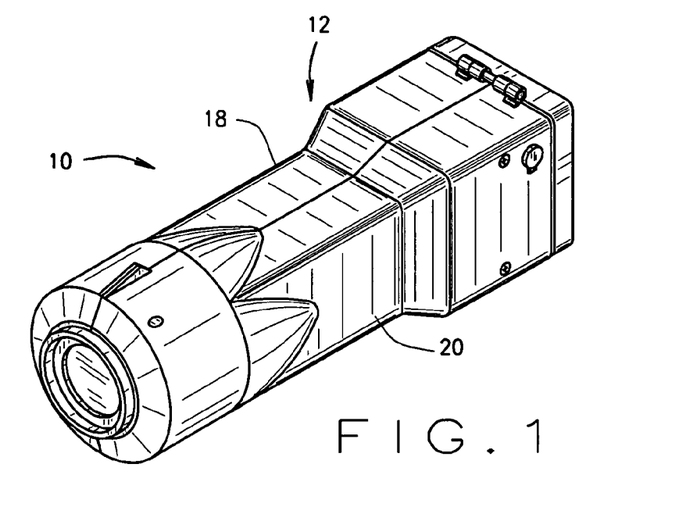
FIG. 1 is a perspective view illustrating a bow camera according to a preferred embodiment of the invention.
Figure 4:
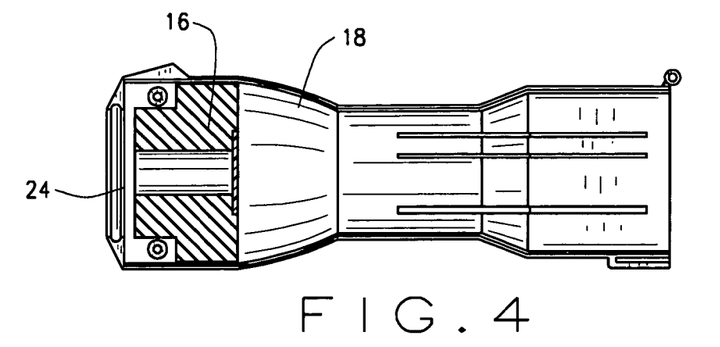
FIG. 4 is a cross-sectional view taken along line 4-4 of FIG. 2.
Figure 5:
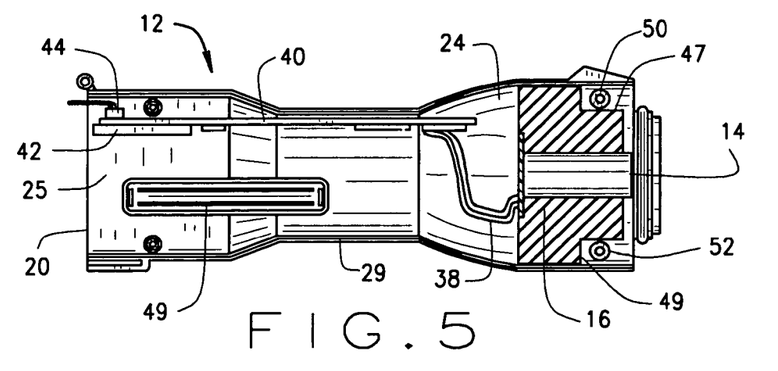
FIG. 5 is a cross-sectional view taken along line 5-5 of FIG. 2.
Figure 16:
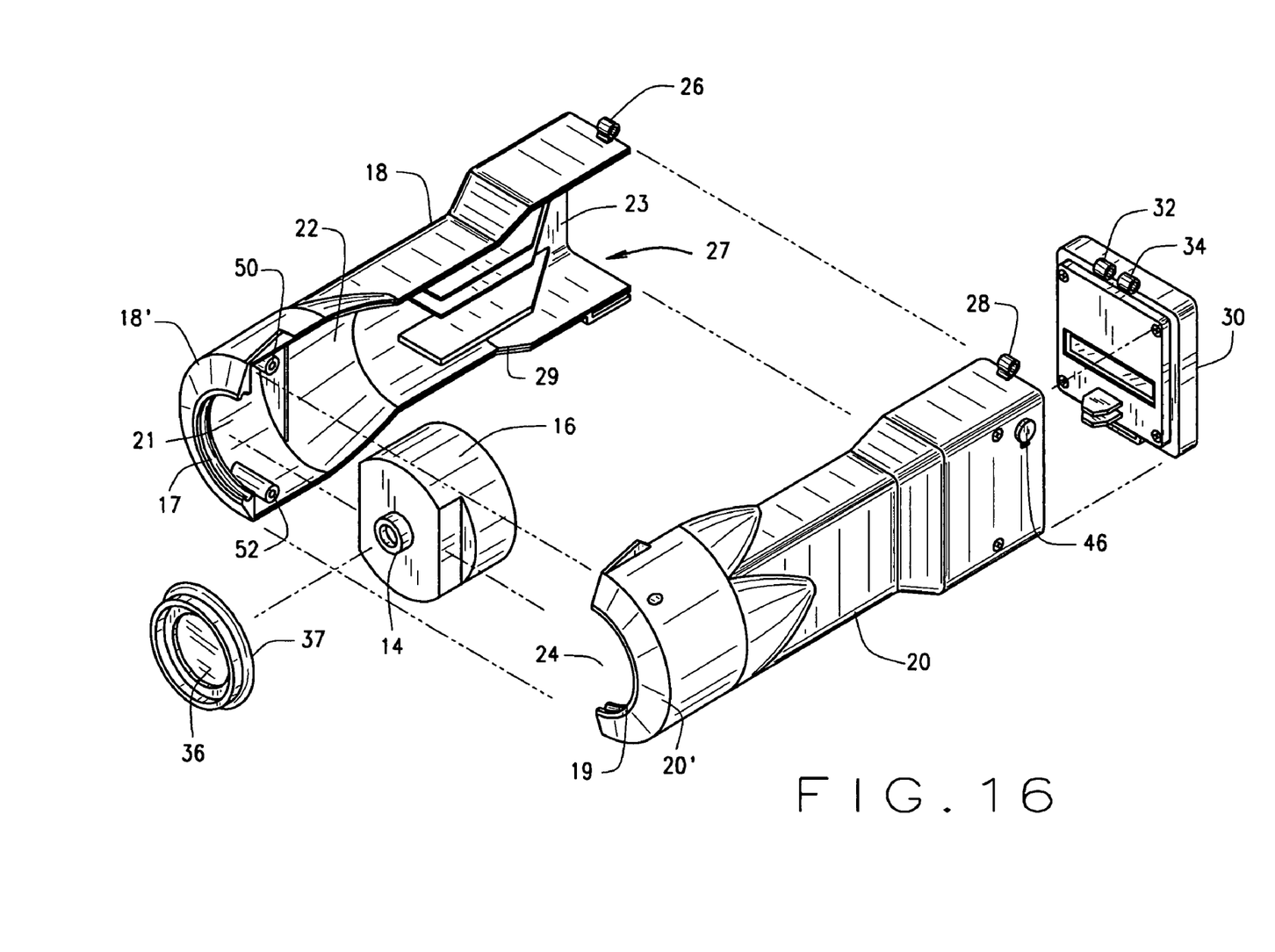
FIG. 16 is an exploded view of the bow camera housing.

An embodiment of the present inventive bow camera apparatus is illustrated in FIG. 1 and is designated generally by the reference numeral 10. The apparatus comprises a housing 12, camera 14 and vibration-dampening member 16 as can best be seen in FIGS. 5 and 16. Housing 12 is comprised of a thermoplastic material, such as a polycarbonate/ABS alloy, or a light-weight metal alloy such as aluminum or magnesium. Housing 12 is comprised of right shell member 18 and left shell member 20 (from the perspective of one pointing the camera) which are adapted to be affixed together by screws or other appropriate fastening members. Right shell member 18 and left shell member 20 join to form an interior space 22 for receiving camera 14 and vibration-dampening member 16. Each of right shell member 18 and left shell member 20 have front flared areas 18' and 20', respectively, which join together to form front compartment 24 as shown in FIGS. 4 and 5. The front ends of right shell member 18 and left shell member 20 define semi-circular openings 17 and 19, respectively, which join together to form viewing opening 21. The rear ends of right shell member 18 and left shell member 20 define openings 23 and 25, respectively, which join together to form rear access opening 27. A gasket 29 is placed between the adjoining edges of right shell member 18 and left shell member 20 to provide a seal to exclude moisture from the interior of housing 12. Hinge sockets 26 and 28 are provided at the rear edges of right shell member 18 and left shell member 20, respectively, as shown in FIG. 16. Rear cover member 30 is removable and permits access into housing 12 through rear opening 27. Hinge sockets 32 and 34 are provided on rear cover member 30 and are adapted to align with hinge sockets 26 and 28 on housing 12 to receive a hinge pin (not shown), thereby permitting rear cover member 30 to swing in pivoting relationship with housing 12 for opening and closing the housing. A latch 33 is provided at an underneath side at the rear of housing 12 to retain cover member 30 in a closed position during operation. A gasket 31 is placed on the interior edges of cover member 30 to provide a seal to exclude moisture from the interior of housing 12 when cover member 30 is closed.

Figure 3:
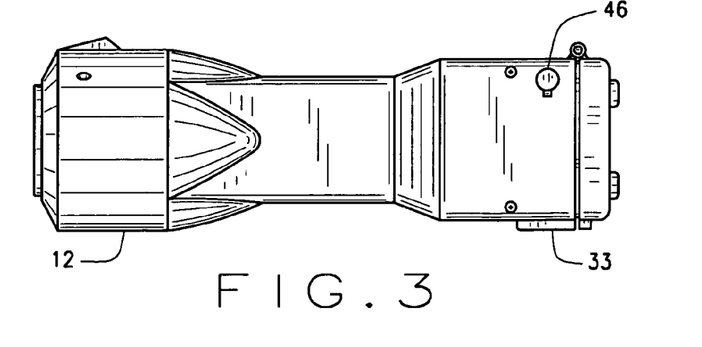
FIG. 3 is a view in side elevation of the bow camera of FIG. 1.

Camera 14 is contained in front compartment 24 of housing 12. Viewing window 36 is held within semi-circular openings 17 and 19, which protects the camera while permitting light to enter housing 12. An O-ring 37 is placed around the perimeter of viewing window 36 to provide a seal to exclude moisture from entering front compartment 24. Camera 14 may be a single shot analog or digital camera, or a multi-frame video camera, with a single fixed focal length lens. To provide audio-visual capability to the camera apparatus, appropriate circuitry 38 generally known to those having skill in the art is provided in housing 12 as shown in FIG. 5. Electronic circuit board 40 enables multiple connectivity and playback features of images and sounds recorded by the apparatus, including phone jack video/audio output, and secure digital (SD) connectivity. SD card slot 42 is connected to electronic circuit board 40 and is disposed in housing 12 such that a flash memory card (not shown) can be introduced through rear access opening 27. A miniature three channel phone jack 44 is also connected to electronic circuit board 40 and, as shown in FIG. 3, access 46 is provided through housing 12 to permit connectivity through an accessory audiovisual cable (not shown). Accordingly, images from the camera may be electronically transmitted to an external display device, such as a computer monitor or a television.

Figure 6:
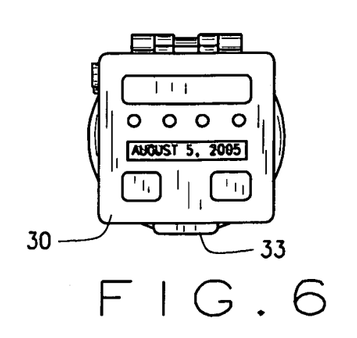
FIG. 6 is an end view of the bow camera of FIG. 1.
Figure 7:
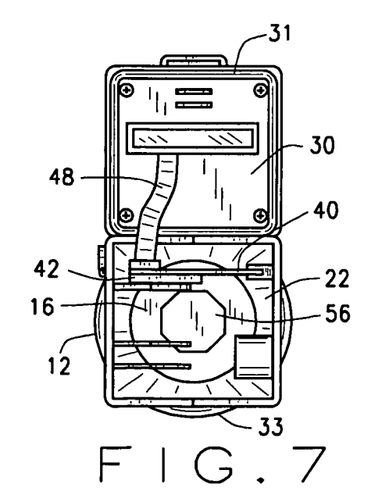
FIG. 7 is an end view of the bow camera of FIG. 1 with the rear cover raised to show the interior of the bow camera housing.

The camera's operating parameters, such as settings, time and date, are displayed in LCD or LED format on rear cover member 30, as shown in FIG. 6, which is in electronic communication with circuit board 40 through ribbon cable 48, as shown in FIG. 7. LED format is preferred because of its greater tolerance for low and high temperature extremes, which are likely to be encountered during hunting. The camera is powered by batteries (not shown) carried in battery pack 49. The camera uses two CR123 lithium primary cells, and a separate "coin" type rechargeable lithium battery to maintain the date, time and other settings. The camera batteries are inserted into battery pack 49 through rear access opening 27. Similarly, a flash memory card is inserted in SD card slot 42 through rear access opening 27 by opening rear cover member 30.

As can be appreciated, a microprocessor controls the operation of the digital camera. The microprocessor operates in accordance with a main program stored in the microprocessor's program memory or in a separate memory chip. The microprocessor is programmed to respond to push buttons arranged on the back of cover member 30. In order to operate the device, a user may press the various push buttons in various predetermined sequences. Thus, pressing a first button may start the recording of a sequence or an event. Other push buttons may be used to stop recording, to start playback, or to advance a video file forward or backward. The microprocessor also may be initiated in playback mode by coupling a connector to output jack 44. Once initiated in this manner, the microprocessor may present various menus on an external video or digital display for the user to select from and may use the push buttons to scroll through and select different menu options. When directed by the appropriate menu selection, the device will stream video images from the memory to the output jack and from there to the device in communication with the output jack, such as a television monitor for viewing or a computer for viewing or storage. Other options may allow the memory to be rewritten and other video images stored therein or may allow certain settings for functions to be initiated or altered.

Camera 14 is disposed in vibration-dampening member 16 to reduce the disturbance caused by the high-frequency vibrations of the bow string upon release. Vibration-dampening member 16 is comprised of a viscoelastic material such as SORBOTHANE® manufactured by Sorbothane, Inc., or NAVCOM® manufactured by Sims Vibration Laboratories. Vibration-dampening member 16 separates camera 14 from direct contact with any mechanical elements that can transmit vibration to the camera, thereby providing shock and vibration isolation in protecting the camera during the release of the bowstring. For example, if bow camera apparatus 10 receives a shock impulse of 25 g for 1 millisecond (rise and fall time of impulse being greater than 50 g per millisecond), the impulse to camera 14 is reduced by vibration-dampening member 16 to a magnitude of less than 5 g with a rise and fall time of less than 2 g per milliseconds, and subsequent oscillations are reduced to less than 1 g at a period of greater than 5 milliseconds. For maximum effectiveness, vibration-dampening member 16 should not have any freedom of movement within housing 12. As can be seen in FIG. 5, the edges of vibration-dampening member 16 engage the interior walls of housing 12, with limited offset portions 47 and 49 corresponding to the passage of screw channels 50 and 52. As shown in FIG. 9A, an interior portion of vibration-dampening member 16 is configured to receive camera 14 in tight tolerance, with the lens portion 54 protruding through the front end as shown in FIGS. 8 and 9 and the circuit board 56 (for a digital camera) positioned at the rear as shown in FIG. 10.

Figure 2:
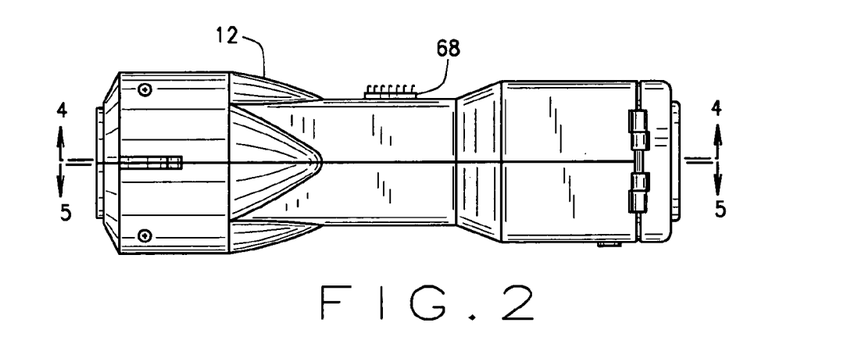
FIG. 2 is a top plan view of the bow camera of FIG. 1.
Figures 8, 9, 10, 11, 12:
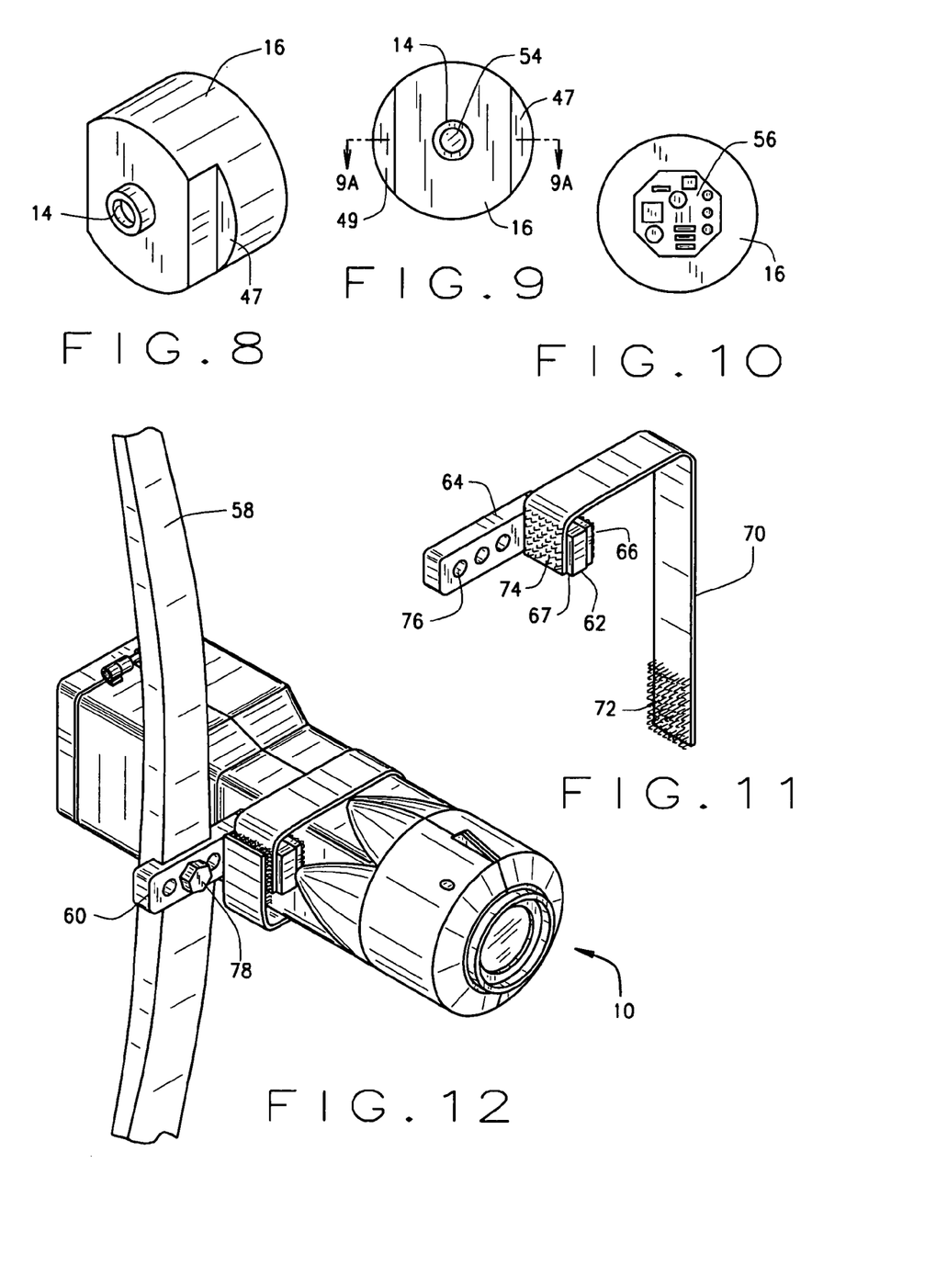
FIG. 8 is a perspective view of an embodiment of the vibration-dampening member of the present invention.
FIG. 9 is a view in side elevation of the front of the vibration-dampening member of FIG. 8.
FIG. 10 is a view in side elevation of the rear of the vibration-dampening member of FIG. 8.
FIG. 11 is a perspective view of an embodiment of the mounting member of the present invention.
FIG. 12 is a perspective view of the bow camera attached to a bow according to an embodiment of the present invention.
Figure 9A:
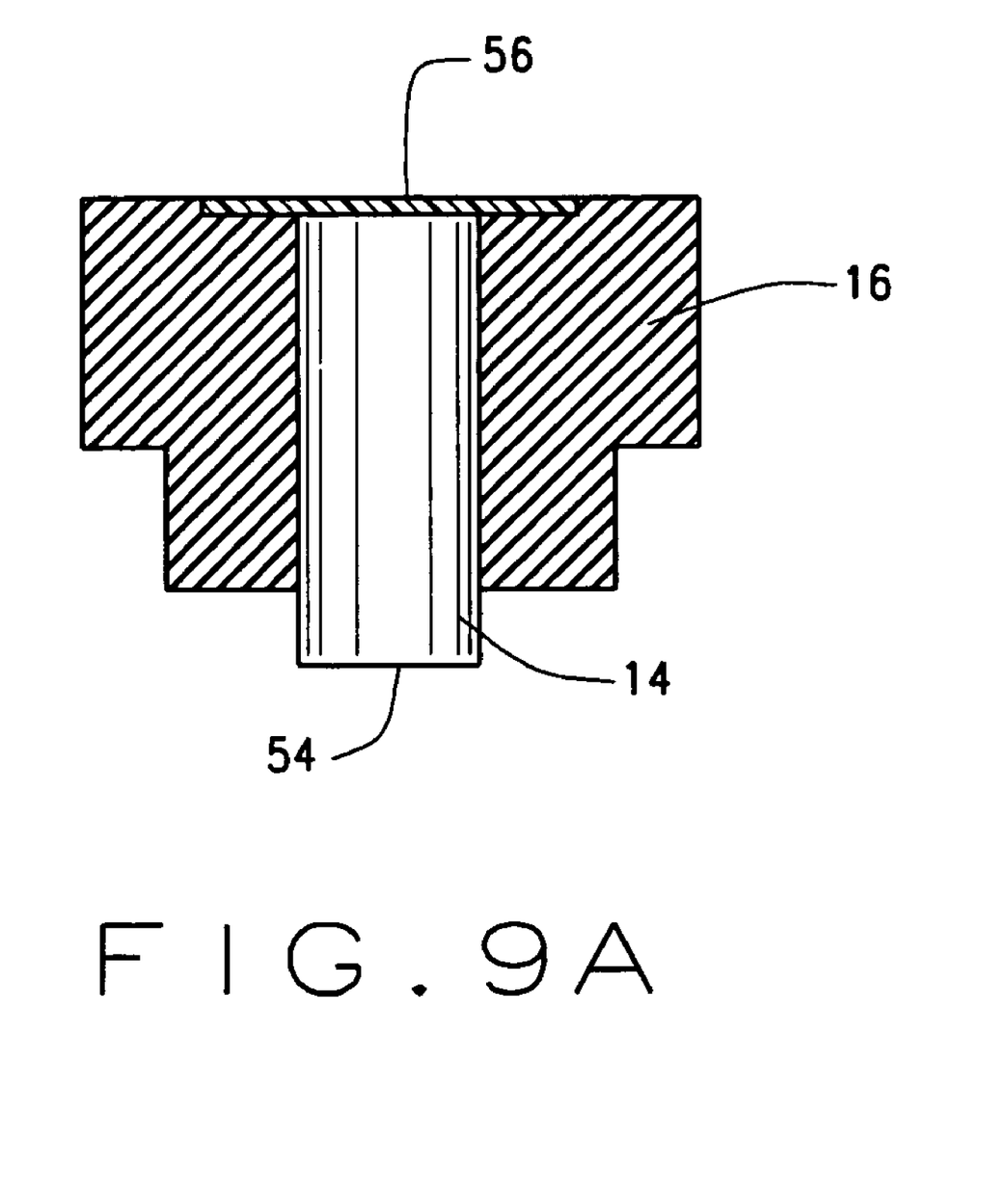
FIG. 9a is a cross-sectional view taken along line 9A of FIG. 9.
Figures 13, 14, 15:
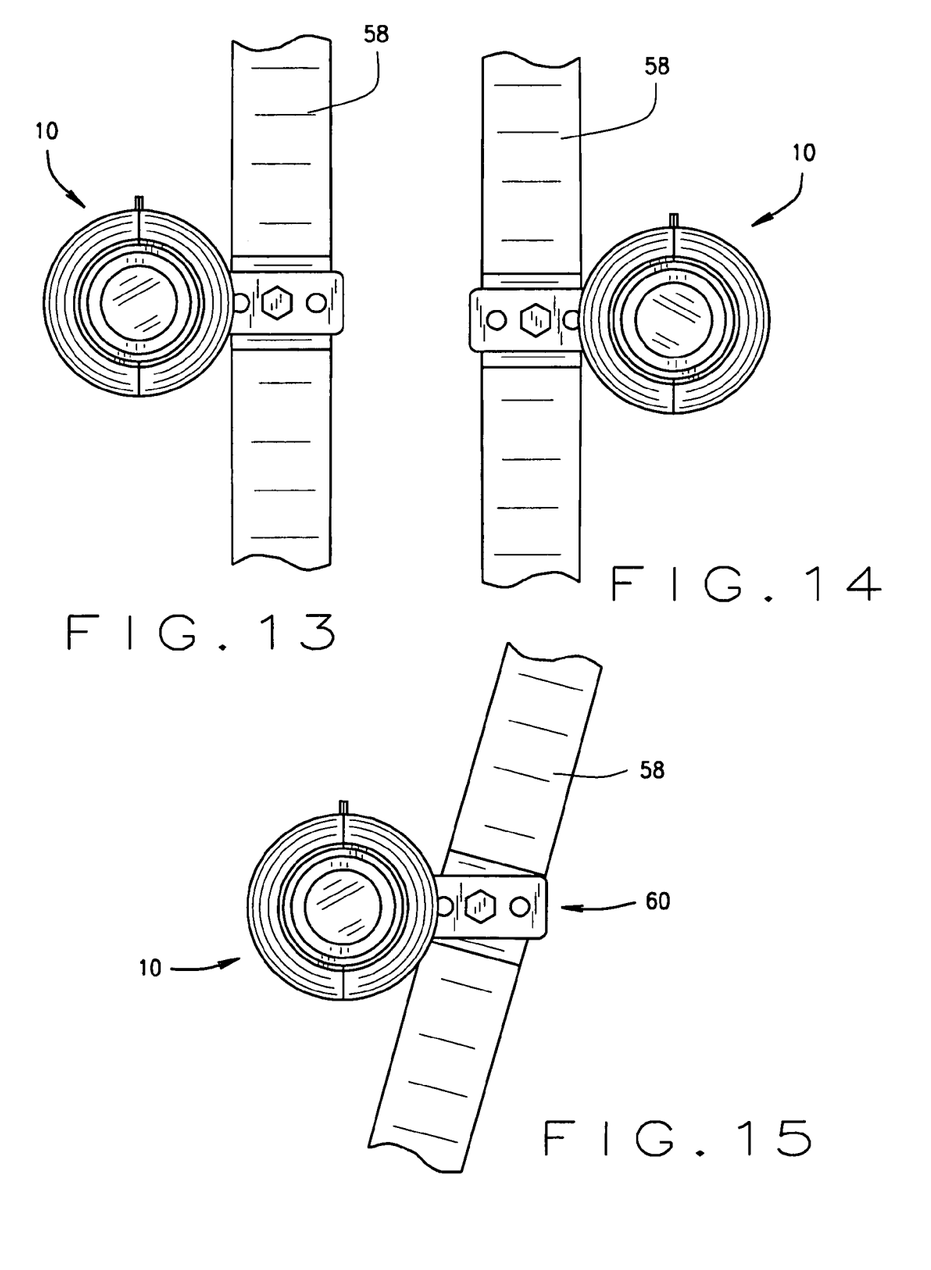
FIG. 13 is a front elevation view of the bow camera attached to a bow adapted for a right-handed archer.
FIG. 14 is a front elevation view of the bow camera attached to a bow adapted for a left-handed archer.
FIG. 15 is a front elevation view of the bow camera attached to a bow according to another embodiment of the invention.

Bow camera apparatus 10 is mounted to a bow 58 through attachment bracket member 60 as shown in FIG. 12. An embodiment of attachment bracket member 60 comprises an L-shaped bracket having a camera housing engaging portion 62 and a bow engaging portion 64 as shown in FIG. 11. Both planar surfaces of housing engaging portion 62 are provided with hook-and-loop fastening material patches 66 and 67. Housing 12 is provided with a corresponding hook-and-loop fastening material patch 68 on its exterior surface, as shown in FIG. 2, which is adapted to connect to attachment bracket member 60 by engaging patch 66 as shown in FIG. 12. For additional stability, strap 70 may be used to more securely bind housing 12 to bracket member 60. The underside 72 of strap 70 is provided with mating hook-and-loop material for corresponding engagement with fastening patch 67 for securing a first end of strap 70 to the top surface of housing engaging portion 62 of the bracket. Strap 70 encircles housing 12 and circles back on itself as shown in FIG. 12. A mating hook-and-loop material patch 74 is provided on the top side of strap 70 at its first end for corresponding securing engagement with the strap underside 72. Bow engaging portion 64 has at least one hole 76, and preferably a series of such holes, which enable the bracket to be secured to the stabilizer hole on the bow using fastener 78. The distance at which the camera apparatus is held from the bow can be adjusted by using different holes 76 to mount the bracket to the bow. For example, to extend the distance of the mounted camera from the bow, the hole closest to the end of bow engaging portion 64 of the bracket would be used. The camera apparatus can be adapted for both right- and left-handed archers, as shown in FIGS. 13 and 14, by simply moving hook and loop fastening material patch 68 to the appropriate side of camera housing 12. For a right-handed archer, the position of patch 68 would be that shown in FIG. 2, while patch 68 would be on the opposite side of housing 12 for a left-handed archer.

Some archers tilt the bow at an angle from the vertical plane when shooting, which can cause the mounted camera to produce recorded images which are likewise tilted. To avoid that problem the attachment bracket member 60 may be rotated about the axis of its connection to bow 58 as shown in FIG. 15 to maintain the camera apparatus at a level position so that the recorded images avoid the tilting effect. This is best accomplished through trial and error, and may require the help of another person to set the position of the camera apparatus to level as the archer draws the bow according to his personal style.

Accordingly, the invention as described herein provides a self-contained digital unit providing each of single-shot, still photography, digital video and audio-visual recording and playback capability, which is mountable to a bow. The digital unit also provides a self-contained vibration-dampening element which adapts the camera for rugged operation under all kinds of adverse environmental conditions encountered during hunting. Further still, the unit is of simple construction making it easy to use in recording images and playing them back.

From the above description of the preferred embodiments of the invention, those skilled in the art will perceive improvements, changes and modifications. Such improvements, changes and modifications within the skill of the art are intended to be covered by the appended claims.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

Having described at least one preferred embodiment of the invention, what is claimed is:

1. A camera apparatus for mounting on an object, the camera apparatus comprising:
   a) a housing;
   b) a camera;
   c) a vibration-dampening member comprised of a visco-elastic substance, wherein the vibration-dampening member has an outer dimension approximating an interior dimension of the housing such that free movement of the vibration-dampening member within the housing is eliminated; and
   d) an attachment bracket member,
   the camera being contained in the housing, the vibration-dampening member engaging the camera within the housing to minimize disturbance to the camera caused by vibrations of the object, the attachment bracket member being adapted to mount the housing of the camera apparatus to the object.

2. The camera apparatus of claim 1 in which the housing has an internal dimension adapted to receive and contain therein a power supply for the camera and a circuitry board for controlling operation of the camera.

3. The camera apparatus of claim 2 in which a secure digital slot for receiving a flash memory card is mounted to the circuitry board within the housing.

4. The camera apparatus of claim 3 in which an interior of the housing is accessible through an end thereof for gaining access to the secure digital slot.

5. The camera apparatus of claim 4 in which a cover member is provided at an end of the housing.

6. The camera apparatus of claim 5 in which the cover member is pivotable.

7. The apparatus of claim 6 in which the cover member is adapted to display the camera operating parameters.

8. The apparatus of claim 2 in which the apparatus is adapted to be in electronic communication with an external device for transmitting images from the camera for viewing.

9. The apparatus of claim 2 in which the housing is water resistant.

10. The camera apparatus of claim 1 in which the camera is embedded within the vibration-dampening member.

11. The apparatus of claim 1 in which the camera has a single fixed focal length lens.

12. The apparatus of claim 1, wherein the object is an archery bow, in which the attachment bracket member is adapted to mount to the archery bow such that the camera apparatus is capable of being disposed laterally from the archery bow at varying distances.

13. The apparatus of claim 12 in which the attachment bracket member defines an attachment point adapted for mounting with the archery bow to permit pivotal movement about the attachment point, whereby a level orientation of the camera is capable of being maintained when the archery bow is held at an angle other than perpendicular to the ground.

14. A camera apparatus for mounting on a projectile-firing apparatus, the camera apparatus comprising:
   a) a housing;
   b) a camera; and
   c) a vibration-dampening member,
   the camera being contained in the housing, the vibration-dampening member engaging the camera within the housing to minimize disturbance to the camera caused by vibrations of the projectile-filing apparatus, and
   the housing having an internal dimension adapted to receive and contain therein a power supply for the camera and a circuitry board for controlling operation of the camera, with a secure digital slot for receiving a flash memory card being mounted to the circuitry board, and an interior of the housing being accessible through an end thereof for gaining access to the secure digital slot.

15. The camera apparatus of claim 14 in which a cover member is provided at an end of the housing.

16. The camera apparatus of claim 15 in which the cover member is pivotable.

17. The apparatus of claim 16 in which the cover member is adapted to display the camera operating parameters.

18. The camera apparatus of claim 14 in which the vibration-dampening member is comprised of a viscoelastic substance.

19. The camera apparatus of claim 18 in which the camera is embedded within the vibration-dampening member.

20. The camera apparatus of claim 18 in which the vibration-dampening member has an outer dimension approximating the interior dimension of the housing such that free movement of the vibration-dampening member within the housing is eliminated.

21. The apparatus of claim 14 in which the apparatus is adapted to be in electronic communication with an external device for transmitting images from the camera for viewing.

22. The apparatus of claim 14 in which the housing is water resistant.

23. The apparatus as set forth in claim 14 in which the camera includes an onboard digital recording medium.

24. A camera apparatus for mounting on an archery bow, the camera apparatus comprising:
   a) a housing;
   b) a camera;
   c) a vibration-dampening member; and
   d) an attachment bracket member adapted to attach to the archery bow at an attachment point such that the camera is capable of being disposed laterally from the archery bow at varying distances and of pivoting about the attachment point to allow for maintaining a level orientation of the camera when the archery bow is held at an angle other than perpendicular to the ground,
   wherein the camera is contained in the housing, the vibration-dampening member engages the camera within the housing to minimize disturbance to the camera caused by vibrations of the archery bow, and the attachment bracket is adapted to mount the housing to the archery bow.

* * * * *